Feb. 27, 1934.  J. MANNESCHMIDT, JR  1,949,106
PRESSURE REGULATING DEVICE FOR A HOT WATER HEATING SYSTEM
Filed April 13, 1929
Fig.1.
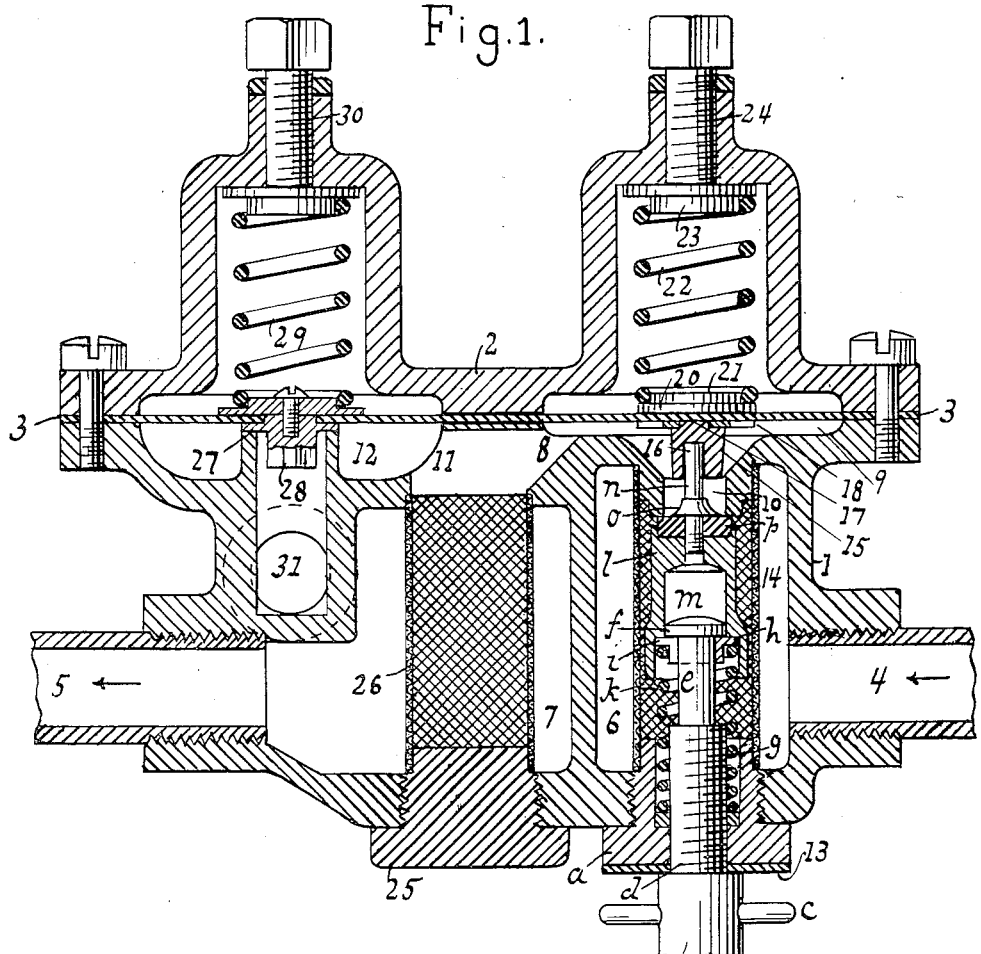
Fig.2.  Fig.3.  Fig.4.
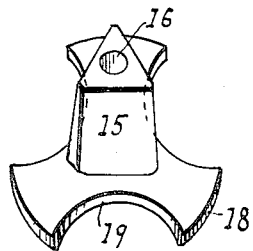 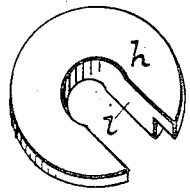 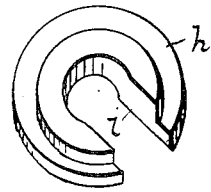
Inventor
Jacob Manneschmidt Jr
By his Attorneys Patented Feb. 27, 1934

1,949,106

UNITED STATES PATENT OFFICE 1,949,106

PRESSURE REGULATING DEVICE FOR A HOT WATER HEATING SYSTEM

Jacob Manneschmidt, Jr., Brooklyn, N. Y.

Application April 13, 1929. Serial No. 354,862

7 Claims. (Cl. 50—23)

My invention relates to an automatic pressure control for hot water heating systems.

The usual pressure controls in these systems are the open tank control and the closed tank control. These systems, however, have many disadvantages and are being entirely replaced by the automatic pressure control which comprises, generally, a pressure regulator valve and a relief valve.

In these devices water is generally filtered before coming in contact with the pressure regulator valve. None of the present automatic pressure controls, however, have any means of protecting the regulator valve or the relief valve from sediment from the boiler. As a matter of fact, however, there is generally more sediment in the water coming from the boiler than there is in the water coming from the supply main and it is this sediment that renders the valves inoperative.

It is one of the objects of my invention to provide means for filtering the water from the boiler before it comes into contact with the valves, as well as the water from the supply mains.

Another disadvantage of practically all of the present automatic controls is that the pressure regulator valve allows only a small stream of water to flow into the system so that a great deal of time is consumed in initially filling the system. In some few of these devices a separate by-pass is provided for filling the system. This has the disadvantage of increasing the size of the device, the number of parts and the cost. It, also, compels a cumbersome arrangement of parts in order to provide for the filtering of the water from the main.

I overcome these disadvantages by constructing a combination pressure regulator valve and system filling valve in a compact unit easily removable from its position for cleaning purposes.

A further object of my invention is to arrange the parts so that the complete device takes up a minimum of space and that all the parts are easily accessible and removable from the outside, whereby the cleaning of the device is greatly facilitated.

Further objects and advantages will appear from the annexed detail description of my device, shown in the accompanying drawing, in which:

Fig. 1 is a vertical longitudinal section of my device and Figs. 2, 3 and 4 are details of elements of the pressure regulating valve.

Referring to the drawing in detail, my device comprises a casing made up of a lower member 1 and an upper member 2 separated by a diaphragm 3 and bolted together. At one end of the lower member is a pipe 4 connected with the water main and at the other end is a pipe 5 connected with the heating system.

In the embodiment shown, the lower member 1 comprises two lower chambers 6 and 7 connected by a passageway 8 formed between said upper and lower members of the unit. Above the chamber 6, which I will call the inlet chamber, is a small chamber 9, which I will call the pressure regulating chamber, the top wall of which is the aforesaid diaphragm 3 and which is connected to chamber 6 by an opening 10 and to chamber 7 by the aforesaid passageway 8.

In addition to passageway 8 there is a second passageway 11 connecting chamber 7, which I will call the discharge water filtering chamber, with a further chamber 12, which I will call the pressure relief chamber, and which, like chamber 9, has for its upper wall the diaphragm 3.

The pipe 4 leads water from the water main into the inlet chamber in which the pressure regulating valve in the form of a unit 13 is contained. This unit comprises a screw threaded plug $a$ adapted to be screwed into the bottom of the inlet chamber. Screwed through the center of this plug $a$ is a bolt $b$ having hand-gripping means $c$, a threaded portion $d$ and a portion of reduced diameter $e$ having on its end a flat head $f$.

The screw threaded end $g$ of the plug $a$ is hollow whereby an annular chamber is formed between the screw threaded end $d$ of the bolt $b$ and said screw threaded end $g$.

Mounted on the reduced portion $e$ of the bolt $b$ is a flanged collar $h$ having an opening $i$ in one side thereof for receiving said member $e$. Held between the flange of said collar $h$ and the bottom of the screw threaded end $g$ of the plug $a$ is a spring $k$. This spring is kept centered with respect to the bolt $b$ by virtue of the cylindrical portion of the collar $h$.

Loosely sitting on the flanged portion of the collar $h$ is a block $l$ having a cavity $m$ to receive the head $f$ of the bolt $b$. Screwed into the end of said block $l$ is a pin $n$ having an integral collar $o$ which serves to hold a washer $p$ made of composition or any other packing substance against the end of said plug $l$. Said washer $p$ is of a diameter sufficient to cover the opening 10 connecting the inlet chamber with the pressure regulating chamber. Said pin extends through the said opening 10 into the pressure regulating chamber.

Carried by the inner end of the threaded member 9 of the plug $a$ is a screen 14 which is adapted to engage the outer walls of the opening 10 in the top wall of the inlet chamber thereby completely screening the pressure regulator valve unit 13.

Mounted on the end of the pin $n$ is a block 15 of angular cross-section (in the drawing shown to be triangular) which is tapered slightly longitudinally and which has a cavity 16 to receive said pin. On the top of said triangular block is a projecting knob 7 carrying a flat plate 8 of a shape corresponding to the shape of the upper part of opening 10 which has an inclined surface upon which said plate 18 is adapted to be received. Said plate 18 has cut out portions 19 to permit the passage of fluid therethrough when said plate is resting on the inclined surface of opening 10.

On the upper side of the diaphragm 3 and in alignment with said pressure regulating valve is a plate 20 having an upper portion of reduced diameter whereby an annular seat 21 is formed on which rests a spring 22. On the upper end of the spring 22 is placed a plate 23 of the same construction as plate 20 in inverted position. Impinging against the upper part of plate 23 is a screw 24 the function of which is to adjust the force of the spring 22.

Screwed into the bottom of chamber 7 is a plug 25 carrying a screen 26 which extends to the top wall of said chamber 7 and surrounds the opening therein with which passages 8 and 11 communicate.

In chamber 12 is an outlet 27 closed by a diaphragm valve 28 which is pressed on its seat by a spring 29 in the upper member 2, the compression of said spring being adjustable by a bolt 30. The outlet 27 communicates with the atmosphere by an opening 31.

Assuming the hot water system to be empty and the various parts in the position shown in the drawing, the operation of the device is as follows:

The bolt $b$ is turned down as far as it will go thereby bringing the head $f$ down and compressing the spring $k$. The plug $l$ which is loosely mounted on collar $h$ follows said bolt to a position which I will term the "system filling position" whereby opening 10 is opened wide. A full stream of water then flows through the opening 10 being filtered by the screen 14 in its passage. This water passes through chamber 9, through the passage 8 and through the chamber 7 into the heating system. The water is allowed to run until the heating system is filled. This system is filled at a predetermined pressure which, for the purpose of this description, I will call 14 lbs. per square inch above atmospheric pressure.

As soon as the system is filled the bolt $b$ is screwed inwardly to its limit. As a matter of practice when the bolt $b$ is screwed inwardly as far as it will go the head $f$ will be slightly above the collar $h$ whereby the packing $p$ is pressed against the opening 10 by the pressure of the spring $k$. The force of the spring 22 is adjusted to be equal to the force of the spring $k$ plus the pressure at which the system is desired to be kept.

When the system is then heated the water will expand as above stated. When the pressure becomes too high in the system the water from the boiler is pressed outwardly into the chamber 7 where all sediment from the heating system is removed from it by the screen 26 and up into the chambers 12 and 9. The force of the spring 29 is made equal to the pressure at which the system is to be operated or relieved, in this case, about 30 lbs. per square inch.

Therefore when the water enters the chamber 12 above the pressure at which the system is to be relieved, valve 28 will be raised off its seat and water will be discharged through the opening 31 until the pressure is brought down to its proper point.

When the system cools the pressure will drop below that point at which the system is operated. This pressure plus the force of the spring $k$ will be insufficient to balance the force of the spring 22 which will accordingly expand pushing down the plug 15 which in turn pushes down the pin $n$ which removes the packing $p$ from the opening 10 to a point which I term the pressure regulating position. Water will then flow in a small stream from the water main and pass into the system until the pressure is again built up to operating pressure.

Having thus described the nature and objects of my invention and illustrated a preferred embodiment of it, to which, however, I do not limit myself but contemplate various modifications within the scope of the appended claims, what I wish to protect by Letters Patent is:

1. In a pressure regulating device for a hot water heating system, in combination, an inlet chamber, a pressure regulating chamber closely adjacent said inlet chamber, a passageway connecting said chambers, a valve mounted in said inlet chamber adapted to close said passageway and capable of occupying two open positions, in one of which said valve permits the passage of only a sufficient amount of water through said passageway to regulate the pressure in the system, and in the other of which said valve permits the passage of a strong stream of water through said passageway for filling the system, said valve having a movable member extending through said passageway into said pressure regulating chamber, said movable member having a cross-section comparatively small with respect to the cross-section of said passageway, means for normally holding said valve in closed position, a diaphragm in said pressure regulating chamber coacting with said movable member to open said valve to pressure regulating position when the pressure in the system drops, means for overcoming the action of said first named means whereby said valve is opened to system filling position.

2. In a pressure regulating device for a hot water heating system, in combination, an inlet chamber, a pressure regulating chamber closely adjacent said inlet chamber, a passageway connecting said chambers, a plug removably mounted in said inlet chamber and carrying a valve adapted to close said passageway, said valve being capable of occupying two open positions, in one of which it permits the passage of only a sufficient amount of water through said passageway to regulate the pressure in the system, and in the other of which it permits the flow of a strong stream of water through the passageway for filling the system, said valve having a movable member extending through said passageway into said pressure regulating chamber, said movable member having a cross-section comparatively small with respect to the cross-section of said passageway, means for normally holding said valve in closed position a diaphragm in said pressure regulating chamber coacting with said movable member to open said valve to pressure regulating position when the pressure in the system drops, and means carried by said plug and accessible from the exterior of said inlet chamber for overcoming the action of said first named means whereby said valve is opened to system filling position.

3. In a pressure regulating device for a hot water heating system, in combination, an inlet chamber, a pressure regulating chamber closely adjacent said inlet chamber, a passageway connecting said chambers, a plug removably mounted in said inlet chamber and carrying a valve for closing said passageway, said valve being capable of occupying two open positions, in one of which it permits the passage of only a sufficient amount of water through said passageway to regulate the pressure in the system, and in the other of which it permits the passage of a strong stream of water through said passageway for filling the system, means operated by a drop in pressure in said system for opening said valve to pressure regulating position, and means carried by said plug comprising a spring normally forcing said valve toward its seat and means for depressing said spring a sufficient distance to permit the valve to drop to system filling position.

4. In a pressure regulating device for a hot water heating system, in combination, an inlet chamber, a pressure regulating chamber closely adjacent said inlet chamber, a passageway connecting said chambers, a plug removably mounted on the outside wall of said inlet chamber and carrying a valve for closing said passageway, said valve being capable of occupying two open positions, in one of which it permits the passage of only a sufficient amount of water through said passageway to regulate the pressure in the system, and in the other of which it permits the passage of a strong stream of water through said passageway for filling the system, means operated by a drop in pressure in said system for opening said valve to pressure regulating position, and means comprising a spring normally forcing said valve toward its seat and means for depressing said spring a sufficient distance to permit the valve to drop to system filling position.

5. In a pressure regulating device for a hot water heating system, in combination, an inlet chamber, a pressure regulating chamber closely adjacent said inlet chamber, a passageway connecting said chambers, a plug removably mounted on the outside wall of said inlet chamber and carrying a valve for closing said passageway, said valve being capable of occupying two open positions, in one of which it permits the passage of only a sufficient amount of water through said passageway to regulate the pressure in the system, and in the other of which it permits the passage of a strong stream of water through said passageway for filling the system, means operated by a drop in pressure in said system for opening said valve to pressure regulating position, and means carried by said plug for opening said valve to system filling position comprising a spring normally forcing said valve toward its seat and means operable from the outside of said device for depressing said spring a sufficient distance to permit the valve to drop to system filling position.

6. In a pressure regulating device for a hot water heating system, in combination, an inlet chamber, a pressure regulating chamber closely adjacent said inlet chamber, a passageway connecting said chambers, a plug removably mounted on the outside wall of said inlet chamber, a spring carried by said plug projecting into said inlet chamber, a cap on said spring comprising a valve for closing said passageway, said spring normally tending to force said valve into closed position, said valve being capable of occupying two open positions, in one of which it permits the passage of only a sufficient amount of water through said passageway to regulate the pressure in the system, and in the other of which it permits the passage of a strong stream of water through said passageway for filling the system, a pin on said valve projecting into said pressure regulating chamber, a diaphragm in said pressure regulating chamber coacting with said pin to open said valve against the action of said spring to pressure regulating position, and means carried by said plug for depressing said spring a sufficient distance to permit said valve to drop to system filling position.

7. In a pressure regulating device for a hot water heating system, in combination, an inlet chamber, a pressure regulating chamber closely adjacent said inlet chamber, a passageway connecting said chambers, a plug removably mounted on the outside wall of said inlet chamber, a spring carried by said plug projecting into said inlet chamber, a cap on said spring comprising a valve for closing said passageway, said spring normally tending to force said valve into closed position, said valve being capable of occupying two open positions, in one of which it permits the passage of only a sufficient amount of water through said passageway to regulate the pressure in the system, and in the other of which it permits the passage of a strong stream of water through said passageway for filling the system, a pin on said valve projecting into said pressure regulating chamber, a diaphragm in said pressure regulating chamber coacting with said pin to open said valve against the action of said spring to pressure regulating position, and means for opening said valve to system filling position comprising a bolt passing through the center of said plug and through the center of said spring, and a collar on the inner end of said bolt adapted to engage the inner end of said spring whereby when said bolt is moved to its outermost position the spring will be depressed a sufficient distance to permit said valve to drop to system filling position.

JACOB MANNESCHMIDT, Jr.